(12) United States Patent
Meis et al.

(10) Patent No.: US 7,611,271 B2
(45) Date of Patent: Nov. 3, 2009

(54) EFFICIENT LIGHT INJECTOR

(75) Inventors: Michael A. Meis, Stillwater, MN (US); David J. Lundin, Woodbury, MN (US); Scott D. Gullicks, Apple Valley, MN (US); Charles D. Hoyle, Stillwater, MN (US)

(73) Assignee: 3M Innovative Properties Company, Saint Paul, MN (US)

( * ) Notice: Subject to any disclaimer, the term of this patent is extended or adjusted under 35 U.S.C. 154(b) by 274 days.

(21) Appl. No.: 11/688,102

(22) Filed: Mar. 19, 2007

(65) Prior Publication Data

US 2008/0232740 A1 Sep. 25, 2008

(51) Int. Cl.
*F21V 33/00* (2006.01)

(52) U.S. Cl. .................. 362/551; 362/555; 362/558

(58) Field of Classification Search .......... 362/551, 362/555, 612, 615, 558, 800, 560, 561; 385/31–35
See application file for complete search history.

(56) References Cited

U.S. PATENT DOCUMENTS

| | | | |
|---|---|---|---|
| 3,923,381 A | 12/1975 | Winston | |
| 5,029,970 A | 7/1991 | Hengst et al. | |
| 5,055,978 A | 10/1991 | Rogoff | |
| 5,432,876 A | 7/1995 | Appeldorn et al. | |
| 5,708,749 A | 1/1998 | Kacheria | |
| 5,718,664 A | 2/1998 | Peck et al. | |
| 5,882,774 A | 3/1999 | Jonza et al. | |
| 6,527,411 B1 * | 3/2003 | Sayers | 362/245 |
| 6,648,485 B1 | 11/2003 | Colgan et al. | |
| 6,905,214 B2 * | 6/2005 | Tani | 353/56 |
| 6,924,014 B2 * | 8/2005 | Ouderkirk et al. | 428/35.7 |
| 7,070,304 B2 | 7/2006 | Imai | |
| 7,195,386 B2 * | 3/2007 | Imade | 362/551 |
| 2004/0213001 A1 * | 10/2004 | Sayers et al. | 362/334 |
| 2004/0218858 A1 | 11/2004 | Guy | |
| 2005/0007753 A1 | 1/2005 | Van Hees et al. | |
| 2006/0008237 A1 * | 1/2006 | Imade | 385/146 |
| 2006/0062013 A1 | 3/2006 | Imade | |
| 2006/0124946 A1 | 6/2006 | Fujita | |
| 2006/0158896 A1 * | 7/2006 | Krupa et al. | 362/555 |

FOREIGN PATENT DOCUMENTS

| | | |
|---|---|---|
| EP | 1 055 867 | 4/2004 |
| WO | WO 01/84229 | 11/2001 |
| WO | WO 03/048635 | 6/2003 |

\* cited by examiner

*Primary Examiner*—Bao Q Truong
(74) *Attorney, Agent, or Firm*—Lance L. Vietzke

(57) ABSTRACT

A light injector includes a tapered solid light guide having a light input end, an opposing light output end, and a total internal reflection surface defining a longitudinal outer surface there between. The light input end includes an aperture extending into the tapered solid light guide defined by an aperture surface. A specularly reflective layer or film is disposed adjacent to the total internal reflection surface. A distance between the specularly reflective layer or film and the total internal reflection surface defines a first air gap. The aperture is configured to accept a lambertian light source.

27 Claims, 2 Drawing Sheets

EFFICIENT LIGHT INJECTOR

FIELD

The present disclosure relates to efficient light injectors and particularly to tapered solid light injectors that efficiently transmit light from a lambertian light source.

BACKGROUND

Solid state light sources such as light emitting diodes (LEDs) are often preferred light sources for many applications because of their small size, pure colors, and long lifetime. However, packaged LEDs are not often optimized for any particular application and designers go to lengths to collect and direct light output for a particular use. Light that is not efficiently utilized is effectively wasted.

Optically transmissive materials, such as glass or polymers may be used as a light guide to propagate light. A light guide often includes at least one surface adapted to receive light from a light source and an optically smooth surface for reflecting light propagating through the light guide. Common examples of light guides include optical fibers traditionally used in the data communication industry and more recently light guides used for illumination purposes. For example, U.S. Pat. No. 5,432,876 discloses one such illumination device employing light guides. In this device, light may be injected into at least one end of a light guide and allowed to exit the guide at a predetermined position or positions along the length of the guide. Light extraction structures or notches are formed in the guide. The extraction structures define first and second reflecting surfaces, which reflect in a radial direction a portion of the light propagating axially through the guide. The reflected light is directed at an angle that is less than the critical angle necessary for continued propagation along the guide according to the principle of total internal reflection. As a result, the reflected light is extracted from the guide.

Collecting light from a lambertian LED source and coupling that light into a light guide is often difficult since this light emitted in all directions from the LED and this light must be redirected into the numerical aperture of the light guide where it can be efficiently maintained by total internal reflection. When a simple reflector is used, the imperfect specular reflectivity of the reflection surface means that some portion of the light is lost on every reflection bounce. A reflector that is designed for collimation of a lambertian light source usually requires a large aspect ratio to achieve the desired output angle. This aspect ratio also means a relatively large number of bounces for light traversing the reflector, and more bounces equate to more loss.

BRIEF SUMMARY

The present disclosure relates to efficient collection and transmission of light from lambertian light sources. In particular this disclosure is directed to compact reflective conical light collector/injector that employs both specular reflectivity and total internal reflection to maximize efficiency.

In a first embodiment, a light injector includes a tapered solid light guide having a light input end, an opposing light output end, and a total internal reflection surface defining a longitudinal outer surface there between. The light output end has a larger circumference than the light input end. The light input end includes an aperture extending into the tapered solid light guide defined by an aperture surface. A specularly reflective layer or film is disposed adjacent to the total internal reflection surface. A distance between the specularly reflective layer or film and the total internal reflection surface defines a first air gap. The aperture is configured to accept a lambertian light source.

In another embodiment, a light injector assembly includes an elongate tube with a first end, an opposing second end, and a tube length there between. The elongate tube has an inner surface and a specularly reflective layer or film disposed adjacent to the inner surface. The first end is configured to accept a lambertian light source. A tapered solid light guide is disposed within the elongate tube. The tapered solid light guide has a light input end, an opposing light output end, and a total internal reflection surface defining a longitudinal outer surface there between. A first air gap is defined by a distance between the specularly reflective layer or film and the total internal reflection surface. The light output end has a larger circumference than the light input end. The light input end includes an aperture extending into the tapered solid light guide defined by an aperture surface. The aperture is configured to accept a lambertian light source.

In a further embodiment, a method of forming a light injector assembly includes providing an elongate tube and a tapered solid light guide. The elongate tube includes a first end, an opposing second end, and a tube length there between. The elongate tube has an inner surface and a specularly reflective layer or film if disposed adjacent to the inner surface. A lambertian light source is disposed adjacent to the first end. The tapered solid light guide includes a light input end, an opposing light output end, and a total internal reflection surface defining a longitudinal outer surface there between. The light output surface has a larger circumference than the light input end. The light input end includes an aperture extending into the tapered solid light guide defined by an aperture surface. The method further includes inserting the tapered solid light guide into the elongate tube such that the lambertion light source is disposed within the aperture and spaced apart from the aperture surface by a first air gap and the total internal reflection surface is spaced apart from the elongate tube inner surface by a second air gap, to form a light guide assembly.

Illumination assemblies are also described and include the light injectors and light injector assemblies described herein. These assemblies include an elongated cylindrical light guide having a light guide light input end positioned to receive light emitted from the light output end of the tapered solid light guide. In some embodiments, these light injectors and the elongated cylindrical light guide form a unitary element.

BRIEF DESCRIPTION OF THE DRAWINGS

The invention may be more completely understood in consideration of the following detailed description of various embodiments of the invention in connection with the accompanying drawings, in which.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

In the following description, reference is made to the accompanying drawings that form a part hereof, and in which are shown by way of illustration several specific embodiments. It is to be understood that other embodiments are contemplated and may be made without departing from the scope or spirit of the present invention. The following detailed description, therefore, is not to be taken in a limiting sense.

All scientific and technical terms used herein have meanings commonly used in the art unless otherwise specified. The definitions provided herein are to facilitate understanding of certain terms used frequently herein and are not meant to limit the scope of the present disclosure.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

The recitation of numerical ranges by endpoints includes all numbers subsumed within that range (e.g. 1 to 5 includes 1, 1.5, 2, 2.75, 3, 3.80, 4, and 5) and any range within that range.

As used in this specification and the appended claims, the singular forms "a", "an", and "the" encompass embodiments having plural referents, unless the content clearly dictates otherwise.

This disclosure relates to efficient collection and transmission of light from lambertian light sources. In particular this disclosure is directed to compact reflective conical light collector/injectors that employ both specular reflectivity and total internal reflection (TIR) to maximize efficient collection and transmission of light emitted from lambertian light sources. While the present invention is not so limited, an appreciation of various aspects of the invention will be gained through a discussion of the examples provided below.

The compact reflective conical light injector/collector is a tapered optical element surrounded by a highly efficient specular reflector. The cone-shaped optical element is separated from the reflector by an air gap. A lambertian light source is disposed within an aperture within a narrow end of the cone-shaped optical element. In some embodiments, the lambertian light source is separated from the aperture surface by an air gap. This cone-shaped optical element configuration causes a continuous reduction of the bounce angle as light traverses the cone-shaped optical element. As a result, the collected light will meet the critical angle requirements for total internal reflection of the cone-shaped optical element. Once light is coupled into the cone-shaped optical element, subsequent reflection bounces will be due to TIR and will be loss-less.

Figure 1:
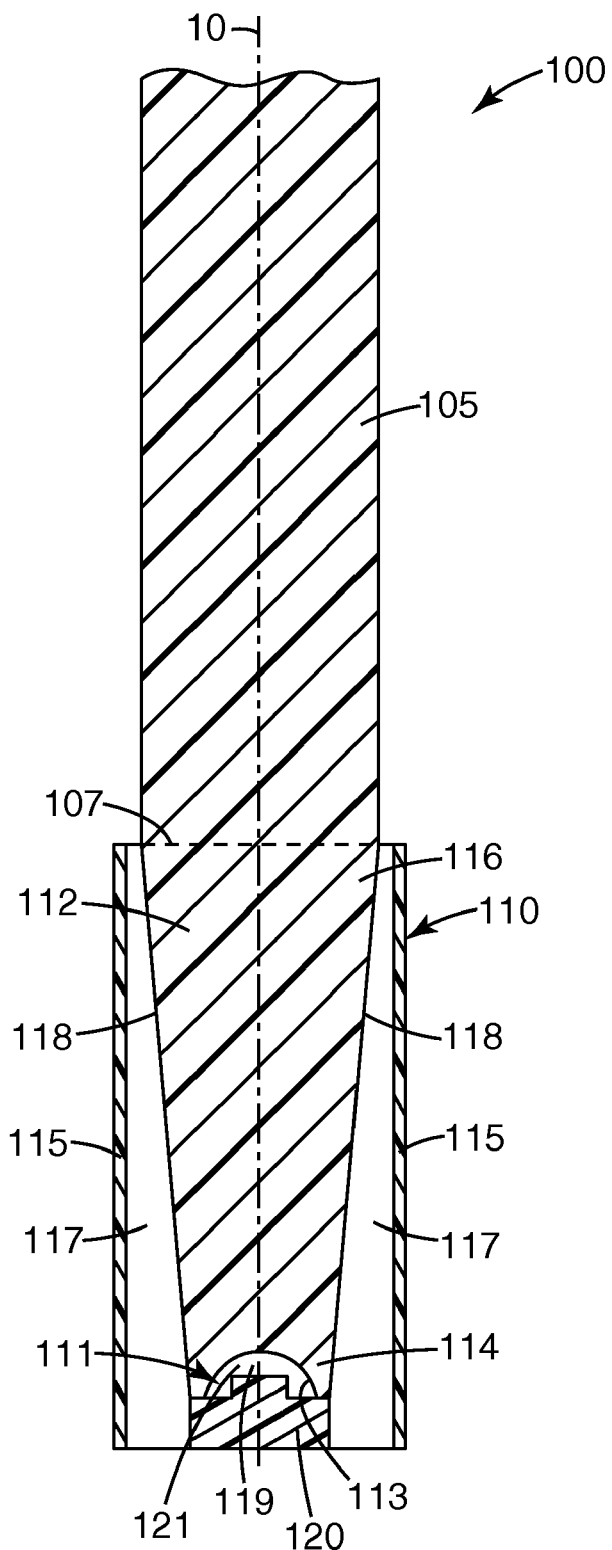
FIG. 1 is a schematic cross-sectional view of an illustrative illumination assembly.

FIG. 1 illustrates an illumination assembly 100 including a light injector 110 and an elongated cylindrical light guide 105. The light injector 110 is coupled to the light guide 105. In many embodiments the light injector 110 is coupled to the light guide 105 with an index matching gel or adhesive at an interface 107 between the injector 110 and the light guide 105. In some embodiments, the injector 110 can be formed onto the end of a light guide 105 to form a unitary element or body, thus eliminating an optical interface and the need to couple or bond the injector to the light guide.

The light injector 110 includes a tapered solid light guide 112 having a light input end 114, an opposing light output end 116, and a total internal reflection surface 118 defining a longitudinal outer surface there between. The light output end 116 has a larger circumference than the light input end 114. The light input end 114 includes an aperture 111 extending into the tapered solid light guide 112 defined by an aperture surface 113 that can have any shape that increases transmission of light into the tapered solid light guide 112. In many embodiments, the aperture surface 113 is a curved aperture surface 113 such as a revolution of a cos curve, a hemispherical aperture surface, and the like. In some embodiments, the aperture surface 113 generally corresponds to an exterior surface of a lambertian light source 120 such that the lambertian light source 120 can be mated with the aperture surface 113.

The tapered solid light guide 112 can have any useful shape. In many embodiments, the tapered solid light guide 112 can have a cone shape or an oblong cone shape (e.g., having an oval cross-section at the light output end 116 and an oval or circular cross-section at the light input end 114. Cone shapes can be useful for injecting light into an elongated cylinder light guide. Oblong cone shapes can be useful for injecting light into a light guide having an oval or rectangular cross-section. The degree of tapering from the light input end 114 to the light output end 116 can be selected to achieve a particular light output beam shape from the light output end 116.

In some embodiments, the tapered solid light guide 112 is configured to substantially (i.e., 95% or greater) fill the light output end 116 numerical aperture with light emitted by the lambertian light source 120. This can be accomplished, in some embodiments, by selecting a taper angle (formed by a total internal reflection surface 118 and a longitudinal axis of the tapered solid light guide 112) in a range from 20 to 50 degrees or from 20 to 35 degrees. These tapered solid light guides 112 can be useful in applications that need a dispersed light beam, for example, in light guide display or illumination applications.

In some embodiments, the tapered solid light guide 112 is configured to substantially (i.e., 95% or greater) collimate light emitted by the lambertian light source 120 from the light output end 116. This can be accomplished, in some embodiments, by selecting a taper angle (described above) in a range from 10 to 20 degrees. These tapered solid light guides 112 can be useful in applications that need a collimated light beam, for example, in light projection applications.

In some embodiments, the tapered solid light guide 112 is configured to substantially (i.e., 95% or greater) collimate light emitted by the lambertian light source 120 from the light output end 116 along a first axis 10 and substantially collimate light emitted by the lambertian light source 120 from the light output end 116 along a second axis orthogonal to the first axis 10. This can be accomplished, in some embodiments, by selecting taper angles (described above) that form an oblong, oval or rectangular cross-section at the light output end 116. These tapered solid light guides 112 can be useful in applications that need a dispersed light beam along one axis and a collimated light beam along an orthogonal axis, for example, in light guide display or illumination applications.

The specularly reflective layer or film 115 is disposed adjacent to, but spaced apart from the total internal reflection surface 118. A distance between the specularly reflective layer or film 115 and the total internal reflection surface 118 defines a first air gap 117. In many embodiments, the air gap 117 completely surrounds the total internal reflection surface 118.

A lambertian light source 120 is disposed within the aperture 111. In many embodiments, a distance between the aperture surface 113 and the lambertian light source 120 defines a second air gap 119. In some embodiments, the air gap 119 completely surrounds the lambertian light source 120. In other embodiments, a distance between the aperture surface 113 and the lambertian light source 120 is a gap 119 that is filled with an index matching gel or adhesive 121 and thus, optically couples the aperture surface 113 and the lambertian light source 120.

In some embodiments, the aperture 111 surface 113 generally corresponds to the exterior surface of the lambertian light source 120 such that the lambertian light source 120 mates with the aperture 111 surface 113. In some embodiments, the tapered solid light guide 112 can be molded or formed with the lambertian light source 120, thus the aperture 111 surface 113 can be formed on the lambertian light source 120 in order to a achieve the complimentary aperture 111 surface 113 that generally corresponds to the exterior surface of the lambertian light source 120.

The light guide 105 and the tapered solid light guide 112 can be any useful complementary shape. In many embodiments, the tapered solid light guide 112 is a cone shape and the light guide 105 is an elongate cylinder shape.

The light guide 105 and the tapered solid light guide 112 can be independently formed of any useful light transmissive material such as, for example, glass, quartz, and/or polymeric material. Useful polymeric material includes polyesters, polycarbonates, polyimides, polyacrylates, polymethylstyrenes, silicones such as GE's Invisisil liquid injection moldable material and the like. The light guide 105 and tapered solid light guide 112 whether separate or combined pieces can be fabricated by injection molding, casting, extrusion or by machining solid materials or any other suitable process. In many embodiments, the light guide 105 and the tapered solid light guide 112 are formed of materials having an index or refraction of 1.4 or greater, or 1.5 or greater, or in a range from 1.4 to 1.7.

The light injector 110 described herein include a specular reflective layer 115 that is disposed adjacent to but not in intimate or optical contact with the total internal reflection surface 118. Since the specular reflective layer is not in intimate contact with the total internal reflection surface 118, light moves out of the light injector 110 mostly via direct emission or through total internal reflection (TIR). Light that escapes through the total internal reflection surface 118 is specularly reflected via the specular reflective layer 115. This configuration has been found to improve the efficiency of the light injector 110. The specular reflective layer 115 can be any useful specular reflective layer such as, for example, a metal or dielectric material. Illustrative specular reflective metal layers or films include silvered mirrors, polished metallic or metalized surfaces.

In many embodiments, the light injectors described herein utilize the unique and advantageous properties of multilayer optical films as the specular reflective layer 115. The advantages, characteristics and manufacturing of such films are described in U.S. Pat. No. 5,882,774, which is incorporated herein by reference. The multilayer optical film is useful, for example, as highly efficient spectral mirrors. A relatively brief description of the properties and characteristics of the multilayer optical film is presented below. In many embodiments, the multilayer polymeric mirror film is Vikuiti® ESR film, which is available from 3M Company, St. Paul, Minn. This multilayer polymeric mirror film reflects greater than 95% of incident light at any angle on the multilayer polymeric film.

Multilayer optical mirror films as used in conjunction with the present invention exhibit relatively low absorption of incident light, as well as high reflectivity for off-axis as well as normal light rays. The unique properties and advantages of the multi-layer optical film provides an opportunity to design highly efficient light injectors which exhibit low absorption losses when compared to known light injector systems. Exemplary multilayer optical mirror film is described in U.S. Pat. No. 6,924,014, which is incorporated herein by reference (see Example 1 and Example 2).

Exemplary multilayer optical mirror film includes a multilayer stack having alternating layers of at least two materials. At least one of the materials has the property of stress induced birefringence, such that the index of refraction (n) of the material is affected by the stretching process. The difference in refractive index at each boundary between layers will cause part of ray to be reflected. By stretching the multilayer stack over a range of uniaxial to biaxial orientations, a film is created with a range of reflectivities for differently oriented plane-polarized incident light. The multilayer stack can thus be made useful as a mirror. Multilayer optical films constructed accordingly exhibit a Brewster angle (the angle at which reflectance goes to zero for light incident at any of the layer interfaces) which is very large or is nonexistent. As a result, these polymeric multilayer stacks having high reflectivity for both s and p polarized light over a wide bandwidth, and over a wide range of angles, reflection can be achieved.

The multilayer polymeric mirror film can include tens, hundreds or thousands of layers, and each layer can be made from any of a number of different materials. The characteristics which determine the choice of materials for a particular stack depend upon the desired optical performance of the stack. The stack can contain as many materials as there are layers in the stack. For ease of manufacture, preferred optical thin film stacks contain only a few different materials. The boundaries between the materials, or chemically identical materials with different physical properties, can be abrupt or gradual. Except for some simple cases with analytical solutions, analysis of the latter type of stratified media with continuously varying index is usually treated as a much larger number of thinner uniform layers having abrupt boundaries but with only a small change in properties between adjacent layers. In many embodiments, the multilayer polymeric mirror film includes low/high index pairs of film layers, wherein each low/high index pair of layers has a combined optical thickness of ½ the center wavelength of the band it is designed to reflect.

For multilayer polymeric mirror films, the desired average transmission for light of each polarization and plane of incidence generally depends upon the intended use of the reflective mirror film. One way to produce a multilayer mirror film is to biaxially stretch a multilayer stack which contains a birefringent material as the high index layer of the low/high index pair. For a high efficiency reflective film, average transmission along each stretch direction at normal incidence over the visible spectrum (400-700 nm) is desirably less than 10% (reflectance greater than 90%), or less than 5% (reflectance greater than 95%), or less than 2% (reflectance greater than 98%), or less than 1% (reflectance greater than 99%). The average transmission at 60 degrees from the normal from 400-700 nm is desirably less than 20% (reflectance greater than 80%), or less than 10% (reflectance greater than 90%), or less than 5% (reflectance greater than 95%), or less than 2% (reflectance greater than 98%), or less than 1% (reflectance greater than 99%).

With the design considerations described in the above mentioned U.S. Pat. No. 5,882,774, one of ordinary skill will readily appreciate that a wide variety of materials can be used to form multilayer polymeric reflective mirror films when processed under conditions selected to yield the desired refractive index relationships. The desired refractive index relationships can be achieved in a variety of ways, including stretching during or after film formation (e.g., in the case of organic polymers), extruding (e.g., in the case of liquid crystalline materials), or coating. In addition, it is preferred that the two materials have similar rheological properties (e.g., melt viscosities) such that they can be co-extruded.

In general, appropriate combinations may be achieved by selecting, as the first material, a crystalline or semi-crystalline material, preferably a polymer. The second material, in turn, may be crystalline, semi-crystalline, or amorphous. The second material may have a birefringence opposite of the first material. Or, the second material may have no birefringence, or less birefringence than the first material. Specific examples of suitable materials include polyethylene naphthalate (PEN) and isomers thereof (e.g., 2,6-, 1,4-, 1,5-, 2,7-, and 2,3-PEN), polyalkylene terephthalates (e.g., polyethylene terephthalate, polybutylene terephthalate, and poly-1,4-cyclohexanedimethylene terephthalate), polyimides (e.g., polyacrylic imides), polyetherimides, atactic polystyrene, polycarbonates, polymethacrylates (e.g., polyisobutyl methacrylate, polypropylmethacrylate, polyethylmethacrylate, and polymethylmethacrylate), polyacrylates (e.g., polybutylacrylate and polymethylacrylate), syndiotactic polystyrene (sPS), syndiotactic poly-alpha-methyl styrene, syndiotactic polydichlorostyrene, copolymers and blends of any of these polystyrenes, cellulose derivatives (e.g., ethyl cellulose, cellulose acetate, cellulose propionate, cellulose acetate butyrate, and cellulose nitrate), polyalkylene polymers (e.g., polyethylene, polypropylene, polybutylene, polyisobutylene, and poly(4-methyl)pentene), fluorinated polymers (e.g., perfluoroalkoxy resins, polytetrafluoroethylene, fluorinated ethylene-propylene copolymers, polyvinylidene fluoride, and polychlorotrifluoroethylene), chlorinated polymers (e.g., polyvinylidene chloride and polyvinylchloride), polysulfones, polyethersulfones, polyacrylonitrile, polyamides, silicone resins, epoxy resins, polyvinylacetate, polyether-amides, ionomeric resins, elastomers (e.g., polybutadiene, polyisoprene, and neoprene), and polyurethanes. Also suitable are copolymers, e.g., copolymers of PEN (e.g., copolymers of 2,6-, 1,4-, 1,5-, 2,7-, and/or 2,3-naphthalene dicarboxylic acid, or esters thereof, with (a) terephthalic acid, or esters thereof, (b) isophthalic acid, or esters thereof, (c) phthalic acid, or esters thereof, (d) alkane glycols; (e) cycloalkane glycols (e.g., cyclohexane dimethane diol); (f) alkane dicarboxylic acids; and/or (g) cycloalkane dicarboxylic acids (e.g., cyclohexane dicarboxylic acid)), copolymers of polyalkylene terephthalates (e.g., copolymers of terephthalic acid, or esters thereof, with (a) naphthalene dicarboxylic acid, or esters thereof, (b) isophthalic acid, or esters thereof, (c) phthalic acid, or esters thereof, (d) alkane glycols; (e) cycloalkane glycols (e.g., cyclohexane dimethane diol); (f) alkane dicarboxylic acids; and/or (g) cycloalkane dicarboxylic acids (e.g., cyclohexane dicarboxylic acid)), and styrene copolymers (e.g., styrene-butadiene copolymers and styrene-acrylonitrile copolymers), 4,4'-bibenzoic acid and ethylene glycol. In addition, each individual layer may include blends of two or more of the above-described polymers or copolymers (e.g., blends of sPS and atactic polystyrene). The coPEN described may also be a blend of pellets where at least one component is a polymer based on naphthalene dicarboxylic acid and other components are other polyesters or polycarbonates, such as a PET, a PEN or a co-PEN.

In many embodiments, the multilayer polymeric reflective mirror film alternating layers include PET/Ecdel, PEN/Ecdel, PEN/sPS, PEN/THV, PEN/co-PET, and PET/sPS, where "co-PET" refers to a copolymer or blend based upon terephthalic acid. Ecdel is a thermoplastic polyester commercially available from Eastman Chemical Co., and THV is a fluoropolymer commercially available from 3M Company, St. Paul, Minn.

The number of layers in the film is selected to achieve the desired optical properties using the minimum number of layers for reasons of film thickness, flexibility and economy. The number of layers can be less than 10,000, or less than 5,000, or less than 2,000. The pre-stretch temperature, stretch temperature, stretch rate, stretch ratio, heat set temperature, heat set time, heat set relaxation, and cross-stretch relaxation are selected to yield a multilayer film having the desired refractive index relationship. These variables are inter-dependent; thus, for example, a relatively low stretch rate could be used if coupled with, e.g., a relatively low stretch temperature. It will be apparent to one of ordinary skill how to select the appropriate combination of these variables to achieve the desired multilayer film. In general, however, stretch ratios in the range from 1:2 to 1:10 (or from 1:3 to 1:7) in the stretch direction and from 1:0.2 to 1:10 (or from 1:0.3 to 1:7) orthogonal to the stretch direction is preferred.

The light injector 110 described herein provides for an unusually efficient light collector/injector. Coupling lambertian emission light into a tapered solid light guide where an air gap exists between the lambertian light source and the tapered solid light guide normally results in light loses of at least 4%. The light injector described herein can provide a collector/injector efficiency of 97% or greater, or 98% or greater, as measured by knowing the light output from the lambertian light source and the light output of the light injector.

In one illustrative example, a compact reflective conical light guide was fabricated from polymethylmethacrylate (PMMA) and polished to an optical finish. The conical light guide had a base or light input end diameter of 6 millimeters, a light output end diameter of 12 millimeters, and a height of 48 millimeters. A hemispherical aperture was formed in the light input end. The hemispherical aperture had a circumference of 5.35 millimeters and a radius of 2.67 millimeters. Multilayer polymeric mirror film (Vikuiti® ESR film available from 3M Company, St. Paul, Minn.) was wrapped about the compact reflective conical light guide leaving a slight air gap between the Multilayer polymeric mirror film and the reflective conical light guide.

A lambertian Luxeon V white LED (available from Phillips Lumileds, San Jose, Calif.) was mounted onto a heat sink and powered up in a 39" Optronic Labs integrating sphere and allowed to operate for about 10 minutes to reach steady state. Once at steady state a light output measurement was taken using the integrating sphere. The lambertian Luxeon V white LED had a light output of 122.4 lumens.

Then the ESR film wrapped compact reflective conical light guide was installed over the lambertian Luxeon V white LED within the hemispherical aperture with an air gap surrounding the LED. The LED was powered up and light emitted from the light output end of the ESR film wrapped compact reflective conical light guide was measured with the integrating sphere at steady state. The ESR film wrapped compact reflective conical light guide had a light output of 120.3 lumerns. Thus, the ESR film wrapped compact reflective conical light guide had a light collection/injection efficiency of 98.3%.

Figure 2:
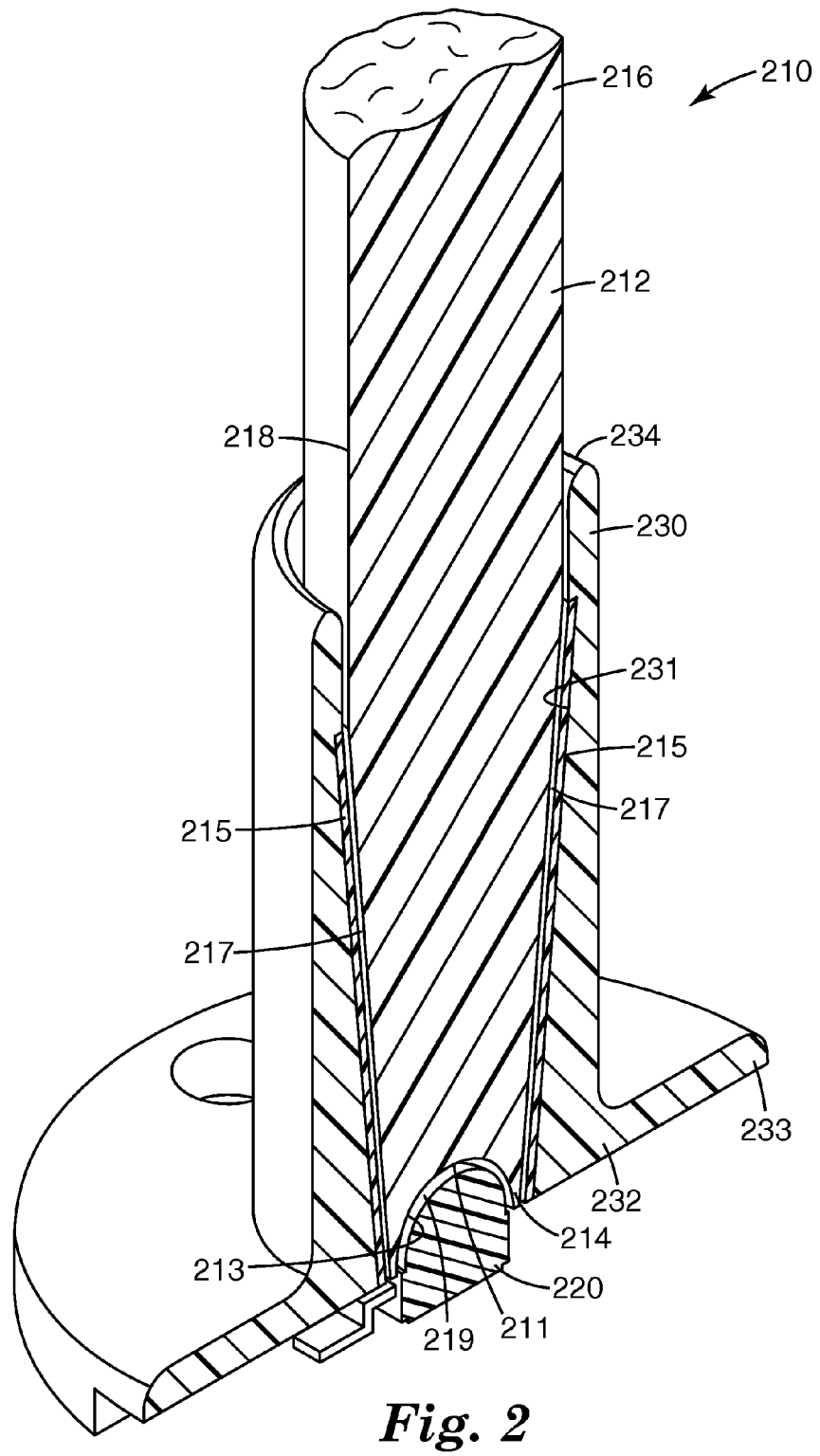
FIG. 2 is a perspective cross-sectional view of an illustrative light injector assembly.

FIG. 2 is a perspective cross-sectional view of an illustrative light injector assembly 210. The light injector assembly 210 includes an elongate tube 230 and a tapered solid light guide 212 (described above) disposed within the elongate tube 230.

As described above, an illumination assembly can include a light injector assembly 210 and an elongated cylindrical light guide (not shown). The tapered solid light guide 212 is coupled to the light guide. In many embodiments the tapered solid light guide 212 is coupled to the light guide with an index matching gel or adhesive at an interface between the tapered solid light guide 212 and the light guide. In some embodiments, the tapered solid light guide 212 can be formed onto the end of a light guide to form a unitary element or body, thus eliminating an optical interface and the need to couple or bond the injector to the light guide.

The light guide and the tapered solid light guide 212 can be any useful complementary shape. In many embodiments, the tapered solid light guide 212 is a cone shaped and the light guide is an elongate cylinder shape.

In many embodiments, the tapered solid light guide 212 is coupled to the elongate tube 230. In many embodiments, the tapered solid light guide 212 is inserted into the elongate tube 230 to form the light injector assembly 210. The elongate tube 230 can be formed of any useful material such as, for example, a polymeric material. In some embodiments, the elongate tube 230 is formed via a molding, or extrusion process.

The elongate tube 230 has a first end 232, an opposing second end 234, and a tube length there between. The first end 232 is configured to accept a lambertian light source 220. The elongate tube 230 has an inner surface 231 and a specularly reflective layer or film 215 (described above) disposed adjacent to the inner surface 231. In some embodiments, the specularly reflective layer or film 215 is fixed or adhered to the inner surface 231 of the elongate tube 230 with, for example, an adhesive.

In some embodiments, the inner surface 231 of the elongate tube forms parallel cylinder walls. In other embodiments, the inner surface 231 of the elongate tube forms tapered cylinder walls. The tapered cylinder walls can have a similar or same cone angle as the tapered solid light guide 212, thus the tapered cylinder wall can be parallel to the longitudinal outer surface defining the tapered solid light guide 212.

A lambertian light source 220 is disposed adjacent to the first end 232. In many embodiments, the elongate tube 230 includes a mounting flange 233. The mounting flange 233 can be disposed at the first end 232 of the elongate tube 230 or the mounting flange 233 can be disposed at the second end 234 (not shown) of the elongate tube 230.

The tapered solid light guide 212 has a light input end 214, an opposing light output end 216, and a total internal reflection surface 218 defining a longitudinal outer surface there between. A first air gap 217 is defined by a distance between the specularly reflective layer or film 215 and the total internal reflection surface 218. The light output end 216 has a larger circumference than the light input end 214.

The light input end 214 includes an aperture 211 extending into the tapered solid light guide 212 defined by an aperture surface 213 (described above). The lambertian light source 220 is disposed within the aperture 211. In many embodiments, a distance between the aperture surface 213 and the lambertian light source 220 defines a second air gap 219. In some embodiments, the air gap 219 completely surrounds the lambertian light source 220. In other embodiments, a distance between the aperture surface 213 and the lambertian light source 220 is a gap 219 that is filled with an index matching gel or adhesive and thus, optically couples the aperture surface 213 and the lambertian light source 220.

Thus, embodiments of EFFICIENT LIGHT INJECTOR are disclosed. One skilled in the art will appreciate that embodiments other than those disclosed are envisioned. The disclosed embodiments are presented for purposes of illustration and not limitation, and the present invention should be limited only by the claims that follow and their equivalents.

What is claimed is:

1. A light injector comprising:
   a tapered solid light guide having a light input end, an opposing light output end, and a total internal reflection surface defining a longitudinal outer surface there between, the light output end having a larger circumference than the light input end, and the light input end includes an aperture extending into the tapered solid light guide defined by an aperture surface; and
   a specularly reflective layer or film disposed adjacent to the total internal reflection surface, wherein a distance between the specularly reflective layer or film and the total internal reflection surface defines a first air gap,
   wherein the aperture is configured to accept a lambertian light source and 97% or greater of light emitted by a lambertian light source is emitted from the light output end.

2. A light injector according to claim 1, wherein 98% or greater of light emitted by a lambertian light source is emitted from the light output end.

3. A light injector according to claim 1, further comprising a lambertian light source disposed within the aperture.

4. A light injector according to claim 3, wherein the lambertian light source is optically coupled to the tapered solid light guide with an index matching gel or adhesive.

5. A light injector according to claim 3, wherein a distance between the aperture surface and the lambertian light source defines a second air gap.

6. A light injector according to claim 1, wherein the tapered solid light guide is a conical solid light guide.

7. A light injector according to claim 1, wherein the specularly reflective layer is a multilayer polymeric mirror film reflecting greater than 95% of incident light at any angle on the multilayer polymeric film.

8. A light injector according to claim 1, wherein the first air gap surrounds the total internal reflection surface.

9. A light injector according to claim 1, wherein the aperture surface is defined by a curved aperture surface.

10. A light injector according to claim 1, wherein the tapered solid light guide is configured to substantially fill the light output end numerical aperture with light emitted by the lambertian light source.

11. A light injector according to claim 1, wherein the tapered solid light guide is configured to substantially collimate light being emitted from the light output end.

12. A light injector according to claim 1, wherein the tapered solid light guide is configured to collimate light emitted by a lambertian light source from the light output end along a first axis and collimate light being emitted from the light output end along a second axis orthogonal to the first axis.

13. A light injector assembly comprising:
   an elongate tube comprising a first end, an opposing second end, and a tube length there between, the elongate tube having an inner surface and a specularly reflective layer or film disposed adjacent to the inner surface, the first end configured to accept a lambertian light source; and
   a tapered solid light guide disposed within the elongate tube, the tapered solid light guide having a light input end, an opposing light output end, and a total internal reflection surface defining a longitudinal outer surface there between, and a first air gap is defined by a distance between the specularly reflective layer or film and the total internal reflection surface, the light output end having a larger circumference than the light input end, and the light input end includes an aperture extending into the tapered solid light guide defined by an aperture surface, wherein the aperture is configured to accept a lambertian light source and 97% or greater of light emitted by a lambertian light source is emitted from the light output end.

14. A light injector assembly according to claim 13, wherein 98% or greater of light emitted by a lambertian light source is emitted from the light output face.

15. A light injector assembly according to claim 13, wherein the aperture surface is defined by a curved aperture surface.

16. A light injector assembly according to claim 13, wherein the tapered solid light guide is a conical solid light guide.

17. A light injector assembly according to claim 13, further comprising a lambertian light source at the first end of the elongate tube and the lambertian light source is optically coupled to the tapered solid light guide with an index matching gel or adhesive.

18. A light injector assembly according to claim 13, further comprising a lambertian light source at the first end of the elongate tube and a distance between the aperture surface and the lambertian light source defines a second air gap.

19. A light injector assembly according to claim 13, wherein the specularly reflective layer is a multilayer polymeric mirror film reflecting greater than 95% of incident light at any angle on the multilayer polymeric film.

20. A light injector assembly according to claim 13, wherein the elongate tube further includes a mounting flange.

21. A method of forming a light injector assembly comprising:
providing an elongate tube comprising a first end, an opposing second end, and a tube length there between, the elongate tube having an inner surface and a specularly reflective layer or film disposed adjacent to the inner surface, and a lambertian light source disposed adjacent to the first end;
providing a tapered solid light guide, the tapered solid light guide having a light input end, an opposing light output end, and a total internal reflection surface defining a longitudinal outer surface there between, the light output surface having a larger circumference than the light input end, and the light input end includes an aperture extending into the tapered solid light guide defined by an aperture surface; and
inserting the tapered solid light guide into the elongate tube such that the lambertian light source is disposed within the aperture and spaced apart from the aperture surface by a first air gap and the total internal reflection surface is spaced apart from the elongate tube inner surface by a second air gap, to form a light guide assembly and 97% or greater of light emitted by a lambertian light source is emitted from the light output end.

22. A method according to claim 21, wherein the inserting step comprises coupling the tapered solid light guide to the elongate tube.

23. A method according to claim 21, further comprising mounting the elongate tube to a mounting substrate.

24. An illumination assembly comprising a light injector according to claim 1 and an elongated cylindrical light guide having a light guide light input end positioned to receive light emitted from the light output end of the tapered solid light guide.

25. An illumination assembly according to claim 24, wherein the elongated cylindrical light guide and the tapered solid light guide form a unitary element.

26. An illumination assembly comprising a light injector assembly according to claim 10 and an elongated cylindrical light guide having a light guide light input end positioned to receive light emitted from the light output end of the tapered solid light guide.

27. An illumination assembly according to claim 26, wherein the elongated cylindrical light guide and the tapered solid light guide form a unitary element.

* * * * *